United States Patent
Suzuki et al.

(10) Patent No.: US 10,907,366 B2
(45) Date of Patent: Feb. 2, 2021

(54) CONCRETE VIBRATOR WITH IDLING MODE

(71) Applicant: MIKASA SANGYO CO., LTD., Tokyo (JP)

(72) Inventors: Sadahisa Suzuki, Saitama (JP); Shinji Ueda, Saitama (JP); Hirotaka Ushijima, Saitama (JP); Kazuhiro Yamashita, Nagoya (JP); Masaki Suzuki, Nagoya (JP); Tomokazu Ando, Nagoya (JP)

(73) Assignee: MIKASA SANGYO CO., LTD., Tokyo (JP)

( * ) Notice: Subject to any disclaimer, the term of this patent is extended or adjusted under 35 U.S.C. 154(b) by 8 days.

(21) Appl. No.: 16/319,064

(22) PCT Filed: Apr. 27, 2018

(86) PCT No.: PCT/JP2018/017118
§ 371 (c)(1),
(2) Date: Jan. 18, 2019

(87) PCT Pub. No.: WO2019/207748
PCT Pub. Date: Oct. 31, 2019

(65) Prior Publication Data
US 2020/0141135 A1    May 7, 2020

(51) Int. Cl.
*E04G 21/06*    (2006.01)
*H02P 29/032*    (2016.01)
(Continued)

(52) U.S. Cl.
CPC .......... *E04G 21/063* (2013.01); *H02P 29/032* (2016.02); *H02P 29/40* (2016.02); *B06B 1/16* (2013.01); *H02K 7/061* (2013.01)

(58) Field of Classification Search
CPC ........ E04G 21/06; H02P 29/032; H02P 29/40; H02P 1/00; H02P 1/04; H02P 1/46;
(Continued)

(56) References Cited

U.S. PATENT DOCUMENTS

| 7,278,777 B2 * | 10/2007 | Elsten | E04G 21/065 366/108 |
| 2004/0144188 A1 * | 7/2004 | Steffen | E04G 21/08 74/86 |

FOREIGN PATENT DOCUMENTS

| DE | 10124145 C1 | 8/2002 |
| JP | S6073962 A | 4/1985 |

(Continued)

OTHER PUBLICATIONS

International Search Report (ISR) and Written Opinion dated Jul. 24, 2018 issued in International Application No. PCT/JP2018/017118.

(Continued)

*Primary Examiner* — Antony M Paul
(74) *Attorney, Agent, or Firm* — Holtz, Holtz & Volek PC

(57) ABSTRACT

A concrete vibrator can automatically change the rotational speed of a motor depending on the state of a vibrating tube. Under control by a controller, the concrete vibrator is operated in a normal mode in which the motor is supplied with driving power having a frequency to make the motor rotate at a rotational speed suitable for air bubble removal, or in an idling mode in which the motor is supplied with driving power having a frequency to make the motor rotate at a lower rotational speed than in the normal mode. The controller measures, per unit of time, a value of a current that is input to the controller or motor, compares a latest current value to a reference value calculated based on a past measurement value, and compares an absolute value of the
(Continued)

comparison value to a threshold to grasp the state of the vibrating tube.

5 Claims, 1 Drawing Sheet

(51) Int. Cl.
  *H02P 29/40* (2016.01)
  *B06B 1/16* (2006.01)
  *H02K 7/06* (2006.01)

(58) Field of Classification Search
  CPC ...... H02P 3/00; H02P 5/00; H02P 7/00; H02P 8/00; H02P 23/00; H02P 25/00; H02P 27/00; H02P 27/04; H02P 27/06; F16H 33/10; E21B 10/086; E21B 7/24
  USPC .......... 74/86; 73/803, 514.29; 248/559, 679; 264/69; 405/182; 427/346; 366/108, 366/117, 251, 282; 175/55, 56; 173/49; 318/400.21, 400.22, 400.01, 700, 721, 318/727, 779, 799, 800, 801, 430, 432
  See application file for complete search history.

(56) References Cited

FOREIGN PATENT DOCUMENTS

| | | | |
|---|---|---|---|
| JP | S60073962 A | | 4/1985 |
| JP | H10252269 A | | 9/1998 |
| JP | 3235027 B2 | | 12/2001 |
| JP | 2004137744 A | * | 5/2004 |
| JP | 2004137744 A | | 5/2004 |
| JP | 2004531384 A | | 10/2004 |
| JP | 2005348502 A | | 12/2005 |
| JP | 2007089284 A | | 4/2007 |
| JP | 2014074297 A | | 4/2014 |

OTHER PUBLICATIONS

Supplementary European Search Report dated Oct. 8, 2019 issued in European Application No. 18769938.

* cited by examiner

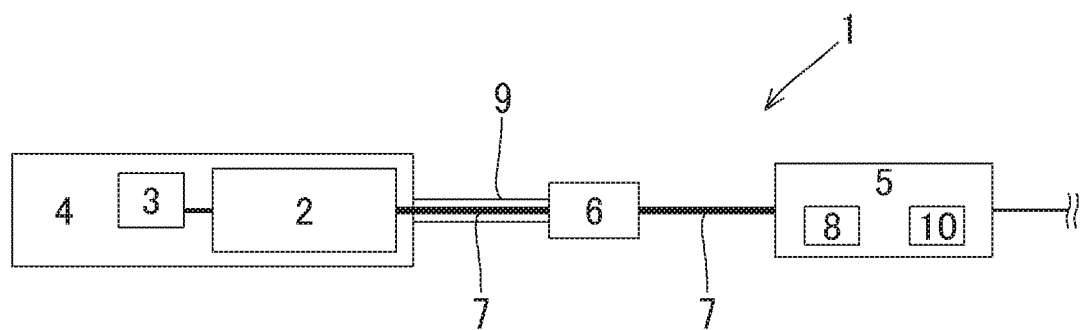

CONCRETE VIBRATOR WITH IDLING MODE

TECHNICAL FIELD

The present invention relates to a concrete vibrator that is used for removing air bubbles from placed concrete, and in particular, to a concrete vibrator that is capable of operating in two modes of a "normal mode" and an "idling mode" and is configured so that these operation modes are automatically switched under control of control means.

BACKGROUND ART

When a concrete placing process is performed in construction sites and the like, a process of removing air bubbles from concrete is performed with the use of a concrete vibrator. The concrete vibrator includes, at its distal end portion, a vibrating tube including a motor and an eccentric weight. The vibrating tube is inserted into uncured concrete to apply vibration to the concrete, thereby enabling air bubbles present in the concrete to be raised and removed.

The motor built in the vibrating tube may get overheated when being continuously rotated at high speed due to accumulation of frictional heat or heat generated by electric resistance, for example. The motor does not, however, get overheated even when being continuously rotated at high speed while the vibrating tube is being inserted into concrete because the vibrating tube is cooled by the concrete surrounding the vibrating tube.

Patent Document 1: JP H10-252269 A
Patent Document 2: JP 2005-348502 A
Patent Document 3: JP 2007-089284 A

SUMMARY OF INVENTION

Technical Problem

However, in a site where the concrete placing process is performed, due to, for example, pumping of concrete that takes long time, the air bubble removing process with the use of the concrete vibrator cannot be performed continuously, and the air bubble removing process is sometimes performed with an interval (a period of time during which the vibrating tube is necessarily drawn out of the concrete to be held in the air). In such an interval of the air bubble removing process, when the concrete vibrator is held in the air for long time while the concrete vibrator is not switched off and the motor is being rotated at high speed, the vibrating tube cannot be sufficiently cooled only by the surrounding air, and the motor may get overheated, leading to a failure.

The present invention has been made in order to solve the problem in the related art, and an object of the present invention is to provide a concrete vibrator that is capable of automatically changing the rotational speed of a motor depending on the state of a vibrating tube, and suitably avoiding overheating of the motor and a failure due to the motor overheating.

Solution to Problem

A concrete vibrator according to the present invention comprising: a vibrating tube including a motor and an eccentric weight; a power supply unit configured to supply driving power to the motor; a switch configured to perform switching between supply and supply stop of the driving power; a power supply cable configured to electrically connect the vibrating tube and the power supply unit to each other; and control means for controlling the driving power to the motor, in which: under control of the control means, the concrete vibrator is configured to operate in a normal mode in which the motor is supplied with driving power having a frequency that makes the motor rotate at a rotational speed suitable for an air bubble removing process, or in an idling mode in which the motor is supplied with driving power having a frequency that makes the motor rotate at a rotational speed lower than the rotational speed in the normal mode; while the motor is being driven, the control means measures, per unit of time, a value of a current that is input to the control means or the motor to record the measurement value in a memory, compares a latest current value input to the control means or the motor to a reference value calculated based on a past measurement value, which has already been recorded in the memory, to calculate a comparison value, and further compares an absolute value of the comparison value to a threshold set in advance; in a case where the concrete vibrator is operated in the normal mode, when the absolute value of the comparison value falls below the threshold, a state where the absolute value of the comparison value falls below the threshold continues, and a continuous time of the state exceeds a reference time, an operation mode is changed to the idling mode; and in a case where the concrete vibrator is operated in the idling mode, when the absolute value of the comparison value exceeds the threshold, the operation mode is changed to the normal mode.

In the concrete vibrator: the latest current value is preferably an average value of a latest measurement value of the current input to the control means or the motor and a plurality of measurement values immediately before the latest measurement value; a first reference value is preferably an average value of a plurality of measurement values measured before the plurality of measurement values used in calculation of the latest current value; a second reference value is preferably an average value of a plurality of measurement values measured before the plurality of measurement values used in calculation of the first reference value; the latest current value and the first reference value are preferably compared to calculate a first comparison value while the latest current value and the second reference value are preferably compared to calculate a second comparison value; and an absolute value of the first comparison value and an absolute value of the second comparison value are each preferably compared to the threshold set in advance. Further, when the concrete vibrator is operated in the idling mode, the motor is preferably supplied with driving power having a frequency that makes the motor rotate at a rotational speed at which the motor does not get overheated even when being continuously driven in air.

In addition, the threshold that is compared to the absolute value of the comparison value is preferably set to a value in a range of from 0.3 A to 2.0 A depending on a size of the vibrating tube (motor output). Further, in the case where the concrete vibrator is operated in the normal mode, when a state where the absolute value of the comparison value exceeds the threshold continues and when the absolute value of the comparison value temporarily falls below the threshold and a continuous time during which the absolute value of the comparison value falls below the threshold does not exceed the reference time, the normal mode is preferably continued, and in the case where the concrete vibrator is operated in the idling mode, when a state where the absolute value of the comparison value falls below the threshold continues, the idling mode is preferably continued.

Advantageous Effects of Invention

The concrete vibrator according to the present invention is automatically changed to the operation mode with the motor rotating at a low rotational speed when the vibrating tube in which the motor is being driven is drawn out of concrete in the interval of the air bubble removing process, for example, and is automatically returned to the normal operation mode when the vibrating tube is inserted into the concrete again. Even when the vibrating tube is drawn out of the concrete to be held in the air while the air bubble removing process is being interrupted, for example, overheating of the motor can be suitably avoided, and further, the occurrence of a failure due to the motor overheating can be prevented.

In addition, an effect can be expected that the concrete vibrator according to the present invention can reduce overall power consumption, to thereby contribute to energy saving. Further, the concrete vibrator according to the present invention can accurately determine the state of the vibrating tube without being affected by individual differences.

BRIEF DESCRIPTION OF DRAWINGS

FIG. 1 is a block diagram illustrating the basic configuration of a concrete vibrator 1 according to a first embodiment of the present invention.

DESCRIPTION OF EMBODIMENTS

Now, a "concrete vibrator" according to an embodiment of the present invention is described. A concrete vibrator 1 of the present embodiment includes, as illustrated in FIG. 1, a vibrating tube 4 including a motor 2 and an eccentric weight 3, a power supply unit 5 configured to supply driving power to the motor 2, a switch 6 configured to perform switching between supply and supply stop (ON/OFF) of the driving power, a power supply cable 7 configured to electrically connect the vibrating tube 4 and the power supply unit 5 to each other, and control means 8 disposed in the power supply unit 5, for controlling the driving power to the motor 2. A portion of the power supply cable 7 located between the vibrating tube 4 and the switch 6 is protected by being covered by a protection tube 9.

The power supply unit 5 is connected to a commercial power supply (or another power supply), which is not shown. The power supply unit 5 converts electric power input thereto to a current having an appropriate frequency by the control means 8 and a frequency converting circuit 10, which are built in the power supply unit 5, and outputs the resultant so that the motor 2 is driven at a desired rotational speed. The motor 2 in the vibrating tube 4 is driven by receiving the electric power that is output from the power supply unit 5 to be supplied to the motor 2 through the power supply cable 7, and the eccentric weight 3 is rotated at high speed, leading to vibration of the vibrating tube 4.

The concrete vibrator 1 is configured to operate in either of modes of a "normal mode" and an "idling mode" under control of the control means 8. The "normal mode" is an operation mode that assumes that the vibrating tube 4 is inserted into concrete and an air bubble removing process is performed. In this mode, the driving power is supplied to the motor 2 after being adjusted to have an appropriate frequency so that the motor 2 is driven at a rotational speed suitable for the air bubble removing process. In the present embodiment, electric power input to the power supply unit 5 is input to a driver of the control means 8, and the frequency of the electric power is converted by the frequency converting circuit 10 to 360 Hz. The electric power is then output from the driver of the control means 8 and the power supply unit 5.

Meanwhile, the "idling mode" is an operation mode that assumes that the vibrating tube 4 is drawn out of the concrete into the air and the air bubble removing process is interrupted. In this mode, the driving power is supplied to the motor 2 after being adjusted to have an appropriate frequency so that the motor 2 is driven at a rotational speed at which the motor 2 does not get overheated even when being continuously driven (a rotational speed lower than the rotational speed in the "normal mode"). In the present embodiment, the frequency of the electric power input to the power supply unit 5 is converted by the driver of the control means 8 to 250 Hz, and the electric power is then output from the power supply unit 5.

Further, the control means 8 automatically changes the operation mode from the "normal mode" to the "idling mode" or from the "idling mode" to the "normal mode", depending on the state of the vibrating tube 4 (whether the vibrating tube 4 is being inserted into the concrete or held in the air). Specifically, the control means 8 continuously monitors, while the motor 2 is being driven, the value of a current that is input to the driver of the control means 8. The control means 8 determines the state of the vibrating tube 4 on the basis of the magnitude of a change in input current value, and suitably selects an operation mode that is appropriate for the state of the vibrating tube 4 to perform switching.

Here, a relationship between the value of the current that is input to the driver of the control means 8 and the state of the vibrating tube 4 is described. The vibrating tube 4 of the concrete vibrator 1 vibrates when the motor 2 is driven by being supplied with the driving power from the power supply unit 5, and the eccentric weight 3 is rotated. Thus, the continuous values of the current that is input to the driver of the control means 8 in the power supply unit 5 take waveforms in different aspects depending on whether the vibrating tube 4 is being inserted into the concrete or held in the air.

Specifically, when the motor 2 is driven while the vibrating tube 4 is being inserted into the concrete, the concrete present around the vibrating tube 4 applies a large load on the motor 2, and hence the value of the current that is input to the driver of the control means 8 have a waveform with a relatively large amplitude. Meanwhile, when the motor 2 is driven while the vibrating tube 4 is being held in the air, a load due to the concrete is not applied, and hence the value of the current that is input to the driver of the control means 8 have a waveform with a more minute amplitude. Thus, the control means 8 can determine the state of the vibrating tube 4, that is, whether the vibrating tube 4 is being inserted into the concrete or held in the air by continuously monitoring the value of the current that is input to the driver of the control means 8 to grasp the magnitude of the change in input current value.

Such a determination on the state of the vibrating tube 4 can also be made by continuously monitoring the value of a current that is input to the motor 2 (that is, the value of a current that is output from the driver of the control means 8) to grasp the magnitude of a change in value of the current that is input to the motor 2.

In the concrete vibrator 1 of the present embodiment, the following routine is executed to determine the state of the vibrating tube 4. First, while the motor 2 is being driven, in either of the operation modes, the driver of the control means 8 measures, per unit of time ("0.1 seconds" in the present embodiment), the value of the current that is input to the driver of the control means 8 to record the measurement value in a memory. Further, in parallel with this, the driver of the control means 8 compares, per unit of time ("0.5 seconds" in the present embodiment), a latest current value calculated on the basis of a latest measurement value of the current that is input to the driver of the control means 8 and other measurement values to a reference value calculated on the basis of past measurement values already recorded in the memory (subtracts the reference value from the latest current value or subtracts the latest current value from the reference value).

In the present embodiment, the latest current value is the average value of the latest measurement value of the current input to the driver of the control means 8 and a plurality of measurement values immediately before the latest measurement value (for example, the average value of the latest measurement value and values measured in 0.4 seconds before the measurement of the latest measurement value). A first reference value is the average value of a plurality of measurement values measured before the plurality of measurement values used in the calculation of the latest current value (for example, the average value of values measured in a period from 0.9 seconds to 0.5 seconds before the measurement of the latest measurement value). In addition, a second reference value is the average value of a plurality of measurement values measured before the plurality of measurement values used in the calculation of the first reference value (for example, the average value of values measured in a period from 1.4 seconds to 1.0 second before the measurement of the latest measurement value). The latest current value and the first reference value are compared (a first comparison value is calculated) and the latest current value and the second reference value are compared (a second comparison value is calculated).

In addition, the driver of the control means 8 compares each of the absolute values of the comparison values (the first comparison value and the second comparison value) between the latest current value and the reference values (the first reference value and the second reference value) to a threshold ("0.3 A" in the present embodiment) set in advance. Here, when the absolute value of the comparison value (one of the absolute value of the first comparison value and the absolute value of the second comparison value) exceeds the threshold, the value of the current that is input to the driver of the control means 8 changes with a large amplitude exceeding the threshold. Further, when the absolute values of the comparison values (both of the absolute value of the first comparison value and the absolute value of the second comparison value) fall below the threshold, the value of the current that is input to the driver of the control means 8 changes only slightly.

Thus, when the absolute value of the comparison value (one of the absolute value of the first comparison value and the absolute value of the second comparison value) exceeds the threshold, the driver of the control means 8 determines that "the vibrating tube 4 is being inserted into the concrete". Meanwhile, when the absolute value of the comparison values (both of the absolute value of the first comparison value and the absolute value of the second comparison value) fall below the threshold, the driver of the control means 8 determines that "the vibrating tube 4 is possibly being held in the air". When the state where the absolute values of the comparison values fall below the threshold continues and the continuous time of the state exceeds a reference time ("60 seconds" in the present embodiment), the driver of the control means 8 determines that "the vibrating tube 4 is being held in the air". The driver of the control means 8 determines whether to change the current operation mode or not on the basis of the result of such a determination on the state of the vibrating tube 4.

Specifically, in the case where the concrete vibrator 1 is operated in the "normal mode", when the absolute values of the comparison values fall below the threshold, this state continues, and the continuous time of the state exceeds the reference time, it is determined that "the vibrating tube 4 is being held in the air", and the operation mode is changed to the "idling mode". Meanwhile, in the case where the concrete vibrator 1 is operated in the "normal mode", when the state where the absolute value of the comparison value exceeds the threshold continues and when the absolute values of the comparison values temporarily fall below the threshold and that state does not continue (the continuous time does not exceed the reference time), it is determined that "the vibrating tube 4 is being inserted into the concrete continuously or intermittently". In this case, the operation mode is not changed and the "normal mode" is continued.

Further, in the case where the concrete vibrator 1 is operated in the "idling mode", when the absolute value of the comparison value exceeds the threshold, it is determined that "the vibrating tube 4 has been inserted into the concrete", and the operation mode is changed to the "normal mode". Meanwhile, in the case where the concrete vibrator 1 is operated in the "idling mode", when the state where the absolute values of the comparison values fall below the threshold continues, it is determined that "the vibrating tube 4 is still being held in the air". In this case, the operation mode is not changed and the "idling mode" is continued.

The concrete vibrator 1 according to the present invention has the configuration as described above. Thus, when, in the interval of the air bubble removing process, for example, the vibrating tube 4 in which the motor 2 is being driven is drawn out of the concrete to be held in the air with the switch 6 being switched on, and that state continues to exceed the reference time, the driver of the control means 8 determines that "the vibrating tube 4 is being held in the air", and automatically changes the operation mode to the "idling mode".

Further, in the "idling mode", the driving power is output from the power supply unit 5 to be supplied to the motor 2 after its frequency is converted so that the motor 2 is driven at the rotational speed at which the motor 2 does not get overheated even when being continuously driven (the rotational speed lower than the rotational speed in the "normal mode"), and hence even when the switch 6 is not switched off, that is, the motor 2 is being continuously rotated, overheating of the motor 2 can be suitably avoided, and further, the occurrence of a failure due to overheating of the motor 2 can be prevented.

Further, when the vibrating tube 4, which has been held in the air, is inserted into the concrete to restart the interrupted air bubble removing process, the driver of the control means 8 determines that "the vibrating tube 4 has been inserted into the concrete", and automatically changes the operation mode to the "normal mode".

In addition, power consumption during operation in the "idling mode" is smaller than power consumption during operation in the "normal mode", and hence the configuration that automatically switches the operation mode to the "idling mode" depending on the state of the vibrating tube 4 can reduce overall power consumption, to thereby contribute to energy saving. Further, a worker can operate the concrete vibrator without frequently switching on and off the switch 6.

As a modified example of the present invention, the following configuration is conceivable. Specifically, when a concrete vibrator being operated in the "normal mode" satisfies certain conditions, the operation mode is automatically changed to a "stop mode" instead of the "idling mode" (that is, the switch 6 is automatically switched off), and supply of driving power to a motor is cut to stop the motor. Under this state, the worker inserts a vibrating tube into concrete, and switches on the switch 6, thereby rotating the motor again. In this case, however, there is a problem that when the motor that has been stopped rotates again, a large activation current is generated to apply a load on the motor.

In contrast to this, in the case of the concrete vibrator 1 of the above-mentioned embodiment, which has the configuration that automatically changes the operation mode from the "idling mode" to the "normal mode" when the vibrating tube 4 that has been held in the air is inserted into the concrete, the magnitude of a change in current before and after the change to the "normal mode" can be small and a load applied on the motor 2 can thus be small. Further, after the operation mode is switched to the "normal mode", the rotational speed of the motor 2 can be raised to a specific rotational speed (the rotational speed suitable for the air bubble removing process) in short time, which gives excellent operability to the worker. This is similar to the fact that a vehicle that has been driven at low speed reaches a specific speed with a small load applied on an engine and needs short time to reach the specific speed, compared to the case where the vehicle that has been stopped is started to reach the specific speed.

When the driving power is supplied to motors 2 of a plurality of concrete vibrators 1 under the same conditions, the values of currents that are actually input to drivers of control means 8 are different from each other due to individual differences even when the concrete vibrators 1 are the same model. Thus, when a fixed value, which is determined in advance, is used as the reference value that is compared to the measurement value in determining the state of the vibrating tube 4 through measurement of the value of the current that is input to the driver of the control means 8, erroneous determination may be made due to the individual differences described above. In the present embodiment, however, as the reference value that is compared to the latest current value, the average value calculated on the basis of the plurality of measurement values immediately before the latest current value in the concrete vibrator 1 is used. The state of the vibrating tube 4 can thus be accurately determined without being affected by the individual differences.

In the present embodiment, the frequency of the driving power to the motor 2 is converted by the frequency converting circuit 10 and the driver of the control means 8 to "360 Hz" in the "normal mode" and to "250 Hz" in the "idling mode". The frequency is not limited to the values, and can take appropriate values (for example, a frequency of "400 Hz" in the "normal mode" and a frequency of "300 Hz" in the "idling mode") depending on the performance of an employed motor 2.

Further, in the present embodiment, the interval (per unit of time) of the measurement of the value of the current that is input to the driver of the control means 8, which is executed by the driver of the control means 8, is set to "0.1 seconds". The measurement of the input current value may, however, be executed with a longer or shorter time interval. Further, in the present embodiment, the interval (per unit of time) of the comparison between the latest current value and the reference value, which is executed by the driver of the control means 8, is set to "0.5 seconds". The comparison between the latest current value and the reference value may, however, be executed with a longer or shorter time interval.

In addition, in the present embodiment, in the determination of the state of the vibrating tube 4, the reference values (the first reference value and the second reference value), which are compared to the latest current value calculated on the basis of the measurement values of the current input to the driver of the control means 8 are "the average value of values measured in a period from 1.4 seconds to 1.0 second before the measurement of the latest measurement value" and "the average value of values measured in a period from 0.9 seconds to 0.5 seconds before the measurement of the latest measurement value". The reference values are, however, not limited to these values, and the average values of past measurement values other than these values can also be used as the reference values. Further, in the present embodiment, the latest current value, which is compared to the reference values, is "the average value of the latest measurement value and values measured in 0.4 seconds before the measurement of the latest measurement value". The latest current value is, however, not limited to this value, and the average value of a plurality of measurement values that are different from these measurement values and are measured after the measurement values used in the calculation of the reference values, or the latest measurement value itself can also be used as the latest current value.

Further, in the present embodiment, in the determination of the state of the vibrating tube 4, the threshold, which is compared to the absolute values of the comparison values between the latest current value and the reference values, is "0.3 A", but the threshold may be set to a larger or smaller value. In addition, the reference time of the continuous time, which is the condition with which the driver of the control means 8 determines that "the vibrating tube 4 is being held in the air" when the state where the absolute values of the comparison values between the latest current value and the reference values fall below the threshold continues, is set to "60 seconds". The reference time may, however, be set to a longer or shorter time. Further, a user may freely set the reference time or change the reference time.

REFERENCE SIGNS LIST

1: Concrete vibrator
2: Motor
3: Eccentric weight
4: Vibrating tube
5: Power supply unit
6: Switch
7: Power supply cable
8: Control means
9: Protection tube
10: Frequency converting circuit

The invention claimed is:
1. A concrete vibrator, comprising:
a vibrating tube including a motor and an eccentric weight;
a power supply unit configured to supply driving power to the motor;
a switch configured to perform switching between supply and supply stop of the driving power;

a power supply cable configured to electrically connect the vibrating tube and the power supply unit to each other; and control means for controlling the driving power to the motor, wherein:

under control of the control means, the concrete vibrator is configured to operate in a normal mode in which the motor is supplied with driving power having a frequency that makes the motor rotate at a rotational speed suitable for an air bubble removing process, or in an idling mode in which the motor is supplied with driving power having a frequency that makes the motor rotate at a rotational speed lower than the rotational speed in the normal mode;

while the motor is being driven, the control means measures, per unit of time, a value of a current that is input to the control means or the motor to record the measurement value in a memory, compares a latest current value input to the control means or the motor to a reference value calculated based on a past measurement value, to thereby calculate a comparison value, and further compares an absolute value of the comparison value to a threshold set in advance;

in a case where the concrete vibrator is operated in the normal mode, when the absolute value of the comparison value falls below the threshold, a state where the absolute value of the comparison value falls below the threshold continues, and a continuous time of the state exceeds a reference time, an operation mode is changed to the idling mode; and in a case where the concrete vibrator is operated in the idling mode, when the absolute value of the comparison value exceeds the threshold, the operation mode is changed to the normal mode.

2. The concrete vibrator according to claim 1, wherein:

the latest current value is an average value of a latest measurement value of the current input to the control means or the motor and a plurality of measurement values immediately before the latest measurement value;

a first reference value is an average value of a plurality of measurement values measured before the plurality of measurement values used in calculation of the latest current value;

a second reference value is an average value of a plurality of measurement values measured before the plurality of measurement values used in calculation of the first reference value;

the latest current value and the first reference value are compared to calculate a first comparison value while the latest current value and the second reference value are compared to calculate a second comparison value; and an absolute value of the first comparison value and an absolute value of the second comparison value are each compared to the threshold set in advance.

3. The concrete vibrator according to claim 1, wherein when the concrete vibrator is operated in the idling mode, the motor is supplied with driving power having a frequency that makes the motor rotate at a rotational speed at which the motor does not get overheated even when being continuously driven in air.

4. The concrete vibrator according to claim 1, wherein the threshold is set to a value in a range of from 0.3 A to 2.0 A.

5. The concrete vibrator according to claim 1, wherein:

in the case where the concrete vibrator is operated in the normal mode, when a state where the absolute value of the comparison value exceeds the threshold continues and when the absolute value of the comparison value temporarily falls below the threshold and a continuous time during which the absolute value of the comparison value falls below the threshold does not exceed the reference time, the normal mode is continued; and in the case where the concrete vibrator is operated in the idling mode, when the state where the absolute value of the comparison value falls below the threshold continues, the idling mode is continued.

* * * * *